UNITED STATES PATENT OFFICE 2,623,907

2,2'-ALKYLIDENE-BIS(6-ALKYL-4-CHLOROPHENOLS)

Clarence L. Moyle, Clare, Mich., assignor to The Dow Chemical Company, Midland, Mich., a corporation of Delaware No Drawing. Application August 27, 1949, Serial No. 112,843

5 Claims. (Cl. 260—619)

This invention is concerned with the 2,2'-alkylidene - bis(6-alkyl-4-chlorophenols) having the formula

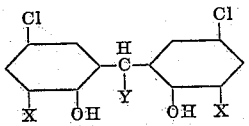

wherein X represents an isopropyl or secondary-butyl radical and Y represents hydrogen or a methyl radical. The new compounds are substantially insoluble in water and somewhat soluble in many organic solvents. They are valuable as constituents of detergent soap compositions to render such compositions germicidal.

The new compounds may be prepared by various methods. One such method comprises reacting in the presence of an acid condensing agent, such as sulfuric acid, 2 molecular proportions of 4-chloro-2-isopropylphenol or 2-secondary-butyl-4-chlorophenol with 1 molecular proportion of formaldehyde or acetaldehyde or of a formaldehyde- or acetaldehyde-yielding substance. When an aldehyde-yielding substance is employed as a reactant, the amount of such material is equivalent to the amount of aldehyde desired in the reaction.

Good results are obtained when operating at 50° C. or lower and employing about 2 moles or more of the substituted phenol per mole of aldehyde. In practice, from about 1 to 17 moles of sulfuric acid per mole of aldehyde in the mixture has been found to favor the production of the compounds in high yields. Often times the reaction may be advantageously carried out in the presence of glacial acetic acid as a reaction medium.

In carrying out the reaction, the substituted phenol, aldehyde or aldehyde-yielding substance, and acetic acid, if employed, are mixed together and concentrated sulfuric acid added portionwise over a short period and with agitation. The condensation begins immediately with the production of the desired bisphenol compound and water of reaction. The reaction is somewhat exothermic, and stirring and cooling are generally required to prevent overheating. Upon completion of the reaction, the desired product may be separated in conventional manner by extraction with a suitable organic solvent such as chlorobenzene or carbon tetrachloride, repeated washing of the solvent extract with water, and fractional distillation under reduced pressure of the residue.

In an alternative method of preparation, the substituted phenol and aldehyde or aldehyde-yielding substance are mixed together and added portionwise over a short period to a mixture of the sulfuric acid condensing agent and glacial acetic acid. The conditions of reaction and methods of separation are essentially as described above.

The following examples illustrate the invention and are not to be construed as limiting the same:

*Example 1.—2,2' - methylene - bis(4 - chloro - 6-isopropylphenol)*

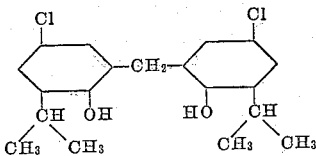

1194.3 grams (7.0 moles) of 4-chloro-2-isopropylphenol (having a freezing point of 46.2° C.), 105 grams of trioxymethylene (equivalent to 3.5 moles CH₂O), and 1750 milliliters of acetic acid were mixed together, and 350 milliliters of concentrated sulfuric acid added portionwise to the above dispersion with stirring. The addition was carried out over a period of 39 minutes and at a temperature of from 40° to 44° C. The reaction mixture was thereafter maintained at a temperature of from 36° to 44° C. for 8 hours to complete the reaction. The crude product was then poured into 7 liters of water, the resulting mixture extracted with 2450 milliliters of chlorobenzene, and the extract washed with water. The washed extract was then distilled under reduced pressure at temperatures gradually increasing to a pot temperature of 170° C. at 25 millimeters' pressure. The residue was blown at 25 millimeters' pressure with 150 grams of steam at 160°–170° C., and thereafter dried by gradually raising the pot temperature to 170° C. at 25 millimeters' pressure. The residue was recrystallized from a petroleum-ether mixture (boiling at 86°–100° C.) to obtain 2,2'-methylene-bis(4-chloro-6-isopropylphenol) as a light tan crystalline solid melting at 90.5°–91° C.

*Example 2.—2,2' - methylene - bis(6-secondary-butyl-4-chlorophenol)*

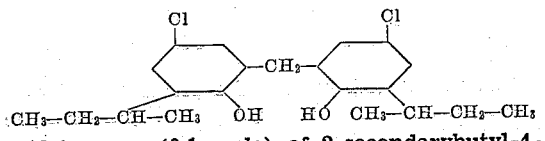

18.4 grams (0.1 mole) of 2-secondarybutyl-4- chlorophenol (having a freezing point of 53.9° C.), 1.6 grams of paraformaldehyde (equivalent to 0.053 mole CH2O), and 10 grams of acetic acid were mixed together and the resulting dispersion added portionwise with stirring and cooling to a mixture of 80 grams of concentrated sulfuric acid, 20 grams of acetic acid, and 5 milliliters of water. The addition was carried out over a period of 5 minutes and at a temperature of from about 0° to 10° C. Stirring was then continued for 30 more minutes, and the resulting reaction mixture thereafter warmed for 15 minutes at 40° to 42° C. to complete the reaction. During the reaction, the crude mixture separated into a liquid acid layer and a sticky amorphous mass. The latter was separated, washed twice with water, and then dissolved at 60° C. in a mixture of 50 milliliters of 20 per cent sodium hydroxide, 80 milliliters of methanol, and 125 milliliters of water. This solution was then poured into dilute aqueous sulfuric acid, the resulting mixture separating into aqueous and oil layers. The latter was separated, extracted with carbon tetrachloride, and the extract washed with water. The carbon tetrachloride was then removed by evaporation, and the residue fractionally distilled under reduced pressure to obtain 2,2'-methylene-bis(6-secondarybutyl-4-chlorophenol) as a viscous orange liquid. The latter had a density of 1.14 at 25° C., a refractive index $n_D$ of 1.5692 at 35° C., and a chlorine content of 18.54 per cent as compared to a theoretical chlorine content of 18.67 per cent.

*Example 3.—2,2' - ethylidene - bis(4 - chloro - 6 - isopropylphenol)*

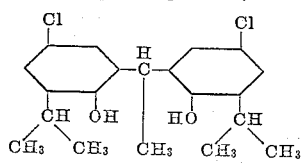

16 grams (0.094 mole) of 4-chloro-2-isopropylphenol (boiling at 149.5–152° C. at 40 millimeters' pressure) and 2.2 grams of paraldehyde (equivalent to 0.05 mole CH3CHO), were mixed together and the resulting dispersion added portionwise with stirring and cooling to a mixture of 80 grams of concentrated sulfuric acid, 20 grams of acetic acid, and 5 milliliters of water. The addition was carried out over a period of 7 minutes, and the resulting mixture thereafter stirred for 3 hours at room temperature to complete the reaction. The crude reaction product was then diluted with 200 milliliters of water, the resulting mixture extracted with carbon tetrachloride, and the extract washed with water. The carbon tetrachloride was then removed by evaporation, and the residue fractionally distilled under reduced pressure to obtain 2,2'-ethylidene-bis(4-chloro-6-isopropylphenol) as a viscous orange oil boiling at 229°–236° C. at 4 millimeters' pressure and having a density of 1.09 at 30° C.

*Example 4.—2,2' - ethylidene - bis(6 - secondarybutyl-4-chlorophenol)*

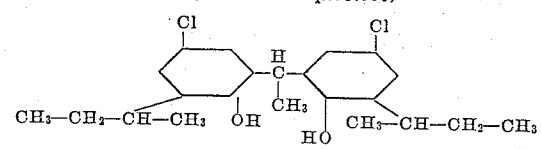

18.4 grams (0.1 mole) of 2-secondarybutyl-4-chlorophenol and 2.64 grams of paraldehyde (equivalent to 0.06 mole CH3CHO) were mixed together and added portionwise with stirring and cooling to 85 grams of concentrated sulfuric acid and 15 grams of acetic acid. The addition was carried out over a period of 2 minutes and at a temperature of from about 12° to 22° C. The reaction mixture was then warmed for 25 minutes at 39° to 40° C. to complete the reaction. The crude reaction product was diluted with 330 milliliters of water, the resulting mixture extracted with carbon tetrachloride, and the extract washed twice with water. The carbon tetrachloride was then removed by evaporation and the residue fractionally distilled under reduced pressure to obtain 2,2'-ethylidene - bis(6 - secondarybutyl-4-chlorophenol) as an orange tacky material having a density of 1.04 at 31° C. and boiling at 245° to 251° C. at 3 millimeters' pressure.

It has been discovered that the 2,2'-alkylidene-bis(6-alkyl-4-chlorophenols) of the present invention are effective as germicides and are adapted to be incorporated in toilet, washing, and so-called liquid soaps to render such detergent compositions germicidal. When the new compounds are incorporated in soap compositions, they retain their germicidal effectiveness against a number of bacterial organisms. In preparing such soap compositions, the bisphenol product may be added directly to the detergent soap during the crutching, milling or similar operation. Another mode of operation comprises dissolving the germicidal bisphenol in a small amount of a suitable solvent such as alcohol or acetone, and dispersing the resulting solution in the detergent soap. In general, any method which results in the germicidal agent's being uniformly distributed in the final soap product is satisfactory. Suitable concentrations of the germicides in the new soap compositions are in the order of from about 1 to 3 per cent by weight of the soap.

Aqueous soap compositions, containing the germicidal compounds of the preceding examples were tested for the control of *Staphylococcus aureus*. In such operations, 100 per cent kills of the test organism were obtained in from 2 to 3 minutes with concentrations of the bisphenol agents of 1 part in 3000 to 1 part in 5000. The following are illustrative of the data obtained:

TABLE

| Compound Tested | Concentration of the Bisphenol Agent at Which a 100 Percent Kill of *Staphylococcus aureus* was obtained in from 2 to 3 Minutes |
|---|---|
| 2,2'-methylene-bis(4-chloro-6-isopropylphenol) | 1 part in 5,000. |
| 2,2'-methylene-bis(6-secondary-butyl-4-chlorophenol) | 1 part in 3,000. |
| 2,2'-ethylidene-bis(4-chloro-6-isopropylphenol) | 1 part in 4,000. |
| 2,2'-ethylidene-bis(6-secondary-butyl-4-chlorophenol) | 1 part in 3,000. |

I claim:

1. A 2,2'-alkylidene - bis(6 - alkyl-4-chlorophenol) having the formula

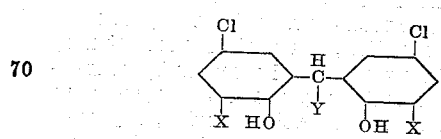

wherein X represents a member of the group consisting of the isopropyl and secondarybutyl radicals, and Y represents a member of the group consisting of hydrogen and a methyl radical.

2. 2,2' - methylene-bis(4 - chloro-6-isopropylphenol).

3. 2,2' - ethylidene-bis(4 - chloro-6-isopropylphenol).

4. 2,2' - methylene-bis(6-secondarybutyl - 4-chlorophenol).

5. 2,2' - ethylidene-bis(6-secondarybutyl - 4-chlorophenol).

CLARENCE L. MOYLE.

REFERENCES CITED

The following references are of record in the file of this patent:

UNITED STATES PATENTS

| Number | Name | Date |
|---|---|---|
| 1,707,181 | Weiler et al. | Mar. 26, 1949 |

OTHER REFERENCES

Florestano Chem. Abst., vol. 43, col. 8614, 8615 (1949) (2 pp.).